US011210876B2

(12) United States Patent
Taylor

(10) Patent No.: US 11,210,876 B2
(45) Date of Patent: Dec. 28, 2021

(54) REMOTE DEVICE INTERFACE AND TELEPHONE ENTRY SYSTEM

(71) Applicant: Alarm.com Incorporated, Tysons, VA (US)

(72) Inventor: Benjamin Taylor, New York, NY (US)

(73) Assignee: Alarm.com Incorporated, Tysons, VA (US)

( * ) Notice: Subject to any disclaimer, the term of this patent is extended or adjusted under 35 U.S.C. 154(b) by 51 days.

(21) Appl. No.: 16/591,027

(22) Filed: Oct. 2, 2019

(65) Prior Publication Data

US 2020/0111274 A1  Apr. 9, 2020

Related U.S. Application Data

(60) Provisional application No. 62/740,841, filed on Oct. 3, 2018.

(51) Int. Cl.
*G07C 9/00* (2020.01)
*H04M 11/02* (2006.01)

(52) U.S. Cl.
CPC ..... *G07C 9/00309* (2013.01); *G07C 9/00571* (2013.01); *H04M 11/025* (2013.01); *H04Q 2213/13405* (2013.01)

(58) Field of Classification Search
CPC ............... G07C 9/00309; H04Q 2213/13405
See application file for complete search history.

(56) References Cited

U.S. PATENT DOCUMENTS

| 4,937,855 | A | | 6/1990 | McNab et al. |
| 5,982,861 | A | * | 11/1999 | Holloway ............ H04M 11/025 |
| | | | | 379/102.01 |
| 7,065,196 | B2 | | 6/2006 | Lee |
| 7,263,182 | B2 | | 8/2007 | Allen et al. |
| 8,285,271 | B1 | | 10/2012 | Parsadayan et al. |
| 8,345,846 | B2 | | 1/2013 | Nassimi |
| 9,571,661 | B2 | | 2/2017 | Marsh et al. |
| 9,691,199 | B1 | * | 6/2017 | Rapp ...................... G10L 17/24 |
| 9,691,205 | B2 | | 6/2017 | Robinson |
| 10,388,090 | B2 | | 8/2019 | Radicella et al. |
| 2017/0214802 | A1 | | 7/2017 | Gaspard et al. |

* cited by examiner

*Primary Examiner* — Daniell L Negron
(74) *Attorney, Agent, or Firm* — Fish & Richardson P.C.

(57) ABSTRACT

Methods and systems for granting access to a building are disclosed. The system includes a telephone entry system associated with the building, a processor in communication with the telephone entry system, a non-transitory computer readable medium. The non-transitory computer-readable medium includes one or more programming instructions that when executed by the processor, cause the processor to receive a request including an access code for access to the building code, determine whether the access code is valid, and transmit to the telephone entry system associated with the building a sequence of dual-tone multi-frequency (DTMF) tones to cause the telephone entry system to grant access to the building in response to determining that the access code is valid.

18 Claims, 4 Drawing Sheets

REMOTE DEVICE INTERFACE AND TELEPHONE ENTRY SYSTEM

RELATED APPLICATIONS AND CLAIMS OF PRIORITY

This patent document claims U.S. provisional patent application No. 62/740,841 filed Oct. 3, 2018 the disclosure of which is hereby incorporated by reference in full.

TECHNICAL FIELD

Aspects of the present disclosure relate to computing devices communicating over a network in different locations, and in particular, a telephone entry system device, such as an intercom located at a doorway of a building, and a client computing device located in another location.

BACKGROUND

Apartment, offices, and other buildings often install communication systems, such as intercoms, at doorways or other access points of the building to enable occupants of such buildings to access the buildings and/or allow visitors to access the buildings. For example, a common type of communication system used to enable access to a building is a telephone entry system that includes components such as a speaker, an I/O interface (or other tone generating mechanism), a microphone, among others. Users engage, for example, the I/O interface to request access to the building at which the telephone entry system is physically located. Existing telephone entry systems may present challenges as they have limited access control and high-maintenance requirements.

It is with these problems, among others, that aspects of the present disclosure where conceived.

SUMMARY OF THE INVENTION

In one or more scenarios, systems and methods for granting access to a building are disclosed. The system may include a telephone entry system associated with a building, a processor and a non-transitory computer readable medium. The non-transitory computer readable medium may include programming instructions to cause the processor to execute the methods disclosed in this disclosure. The method may include receiving a request for access to the building, wherein the request comprises an access code, determining whether the access code is valid, and in response to determining that the access code is valid, transmitting to a telephone entry system associated with the building a sequence of dual-tone multi-frequency (DTMF) tones to cause the telephone entry system to grant access to the building.

In certain embodiments, the method may also include denying access to the building in response to determining that the access code is not valid.

Optionally, receiving the request for access to the building may include receiving the request from a communication device associated with a user requesting access. The communication device may be configured to transmit the request for access to the building to the processor upon receipt of a user request and/or detection of proximity to the building.

In some embodiments, receiving the request for access to the building may include receiving the request from the telephone entry system upon receipt of at least a portion of the access code at a user interface of the telephone entry system. Optionally, receiving the request for access to the building may include receiving a first sequence of DTMF tones that correspond to the access code from the telephone entry system. In such embodiments, the method may also include extracting the access code from the first sequence of DTMF tones. The telephone entry system may be configured to initiate a call to a programmatically controlled telephone number associated with the processor, upon receipt of at least the portion of the access code.

In at least one embodiment, determining whether the access code is valid may include determining whether the access code matches a previously stored access code. Optionally, determining whether the access code is valid may include determining whether a time constraint associated with access code allows for grating access to the building at a requested time.

In certain embodiments, the method may also include transmitting an access granted notification to a user requesting access in response to determining that the access code is valid.

BRIEF DESCRIPTION OF DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
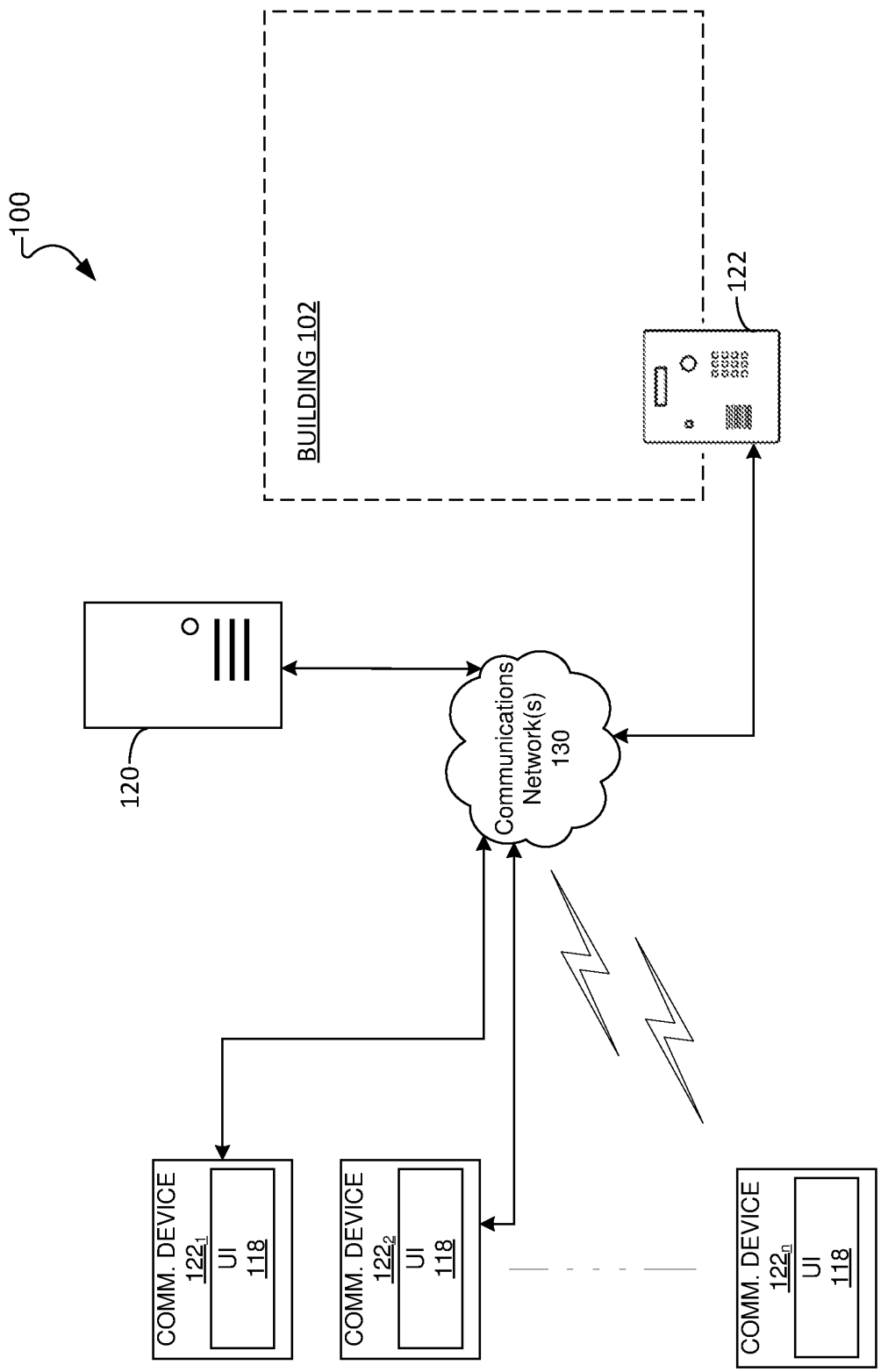
FIG. 1 is a block diagram illustrating a network computing environment for implementing remote access to a building using an existing telephone entry system, according to aspects of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included below.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 4. In this document, the term "mobile electronic device" refers to a portable electronic device such as, without limitation, a smartphone, a tablet, a smartwatch, a PDA, a camera, a laptop, or the like.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Various buildings, such as apartment buildings, office buildings, condominium complexes, gated residential communities, industrial parks and other secured locations often include a locked entrance and a security system or communications system for establishing communication between visitors who wish to enter the secured location and persons who are capable of unlocking the entrance from a remote location. For example, a common type of security system and/or communication system is a "telephone entry system", which uses telephone systems to establish such communication.

A "resident" of a building may be a person(s) who lives, works, or otherwise dwells in the building for a time period that is not temporary or transient. On the other hand, a "visitor" enters the building temporarily or transiently and may need to request access to enter the building. Examples of residents may be, for example, tenants or homeowners in a residential/apartment building, employees in a work/office building or an apartment building, or the like. Examples of visitors may include, without limitation, mail delivery personnel, guests of residents, maintenance people, or the like. Access to the building may be granted by "authorized personnel" including, without limitation, residents, building security personnel, building manager, or the like.

In a typical arrangement, a telephone entry system (interchangeably, intercom system) is provided at the entrance or doorway of a building. The telephone entry system is connected to a telephone line and to the entrance of the building or doorway lock. The telephone entry system usually includes a keypad to provide access to a numbered directory of persons, businesses, or other parties capable of unlocking the entrance. Thus, when a visitor arrives at the entrance or doorway and provides a code into the control system keypad, the telephone entry system dials the telephone number corresponding to the code number. Once the identity of the person who wishes to gain access is established (e.g., by the authorized personnel), the called party can unlock the entrance by pressing a predetermined number into the keypad of the called telephone.

Many technical problems and limitations exist with typical telephone entry systems. For example, traditional telephone require a time-consuming and cumbersome process to locate the code number of a particular party within the directory, particularly for a large building with many occupants. Another technical issue is that maintenance of such systems can be complicated and usually requires skilled technicians to make the installation, which is time consuming and expensive. Yet another technical issue is that typical systems do not offer an ability for visitors to enter temporary access codes in a secure, manageable manner. While typical systems have the ability for the creation of access codes, the process is typically localized to the system itself and/or cumbersome to complete, and the management of these access codes (setting the specific dates and times that they should or should not be valid as well as turning the access codes "on" or "off") is a complex process that can only be done by the building management and/or staff. Thus, the use of such typical systems results in temporary access codes not being implemented and available to tenants and/or building management in an efficient and automated matter. Additionally, the use of typical systems to generate access codes sometimes results in systems having access codes that are static over long periods of time and shared with numerous outside visitors and guests, which is inherently insecure and thus typically hasn't been deployed across most systems installed today. Tenants living in properties with telephone entry systems typically do not have an interface on a remote device to easily create and manage temporary access codes. Managers of these devices and properties subsequently do not have an interface for managing and viewing the access of these visitors.

Aspects of the present disclosure solve the specific technical problems described above, among others, by providing a system that enables remote and/or indirect access and communication (e.g., control through a mobile device) to an intercom system or a telephone entry system that controls entry and access to a building, such as an apartment building or office building, using temporary access codes. The system receives a temporary access code from a communication device, and based on the temporary access code, the system initiates programmatically controlled telephone numbers to access the telephone entry system, validate user access, and provide access (e.g., unlock a door) at the building. Furthermore, the disclosed system generates and securely manages temporary access codes that facilitate remote access to a telephone entry system.

FIG. 1 illustrates one example of a system 100 that may be used to implement various aspects of the present disclosure. Generally, the system 100 includes various devices communicating and functioning together to enable access control to a building, such as an apartment building or office building.

A communications network 130 allows for communication in the system 100. The communications network 130 may include one or more wireless networks such as, but not limited to, one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (VWVAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, 5G, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. Communications network 130 may also include wired networks.

As further illustrated, the system 100 includes a building 102, such as an apartment building, at which a user (e.g., a visitor, guest, building resident, or the like) may request access via a telephone entry system 122. For example, the user may be a guest of a resident of a particular apartment or office located within the building 102.

To request access to the building 102, the user may interact with a UI 118 of one or more communication devices $122_1$, $122_2$,-$122_N$, and provide a notification or indication to the server computing device 120 that the user would like to obtain access to the building 102. The one or more communication devices $122_1$, $122_2$,-$122_N$ may be any electronic device. For example, the communication devices $122_1$, $122_2$,-$122_N$ may be a personal computer, work station, mobile device, mobile phone, tablet device, processor, and/or other processing device capable of implementing and/or executing processes, software, applications, etc., that includes network-enabled devices and/or software, such as a user-interface 118 for communication over the communications network 130 (e.g., browsing the internet). Additionally, the one or more communication devices $122_1$, $122_2$,-$122_N$, may include one or more processors that process software or other machine-readable instructions and may include a memory to store the software or other machine-readable instructions and data.

When interacting with the one or more communication devices $122_1$, $122_2$,-$122_N$ to generate an access notification, the users may be remotely located from the telephone entry system 122. Stated differently, the users do not have to be in physical proximity to the telephone entry system 122 to request access and initiate an access notification. While this disclosure describes systems and methods for providing access to a building using a remote communication device, the communication devices $122_1$, $122_2$,-$122_N$ being located in physical proximity with the telephone entry system 122 is within the scope of this disclosure.

In certain embodiments, the user interface 118 does not require users to directly initiate a telephone call to request access to the building 102 (as this is done by the computing interface in the background), resulting in an abstraction of the telephone call actions and other actions that are necessary to engage the telephone entry system in unlocking the door. The user may request access by interacting with, for example, an application downloaded and installed on the communication devices $122_1$, $122_2$,-$122_N$, that does not require initiating a telephone call. Furthermore, the user requesting access does not have nor requires knowledge of the Dual-Tone Multi-Frequency ("DTMF") signaling mechanism required for the telephone entry system to provide access to the building.

The access notification may be forwarded or otherwise transmitted to a server computing device 120 for automatic and programmatic processing of requests to access the building 102. More specifically, to enable access to the building 102, the server computing device 120 receive an access notification and may execute an application, programming instructions, algorithm, and/or the like, that employs a DTMF signaling mechanism to cause the telephone entry system 122 to provide access to the building 102 (e.g., unlock a door). The server computing device 120 may also verify an access code before providing and/or denying access to the building 102. In one or more embodiments, the server computing device 120, includes one or more processor(s) 122, communicates with the one or more communication devices $122_1$, $122_2$,-$122_N$ and the telephone entry system 122 to control access to the building 102.

Figure 2:
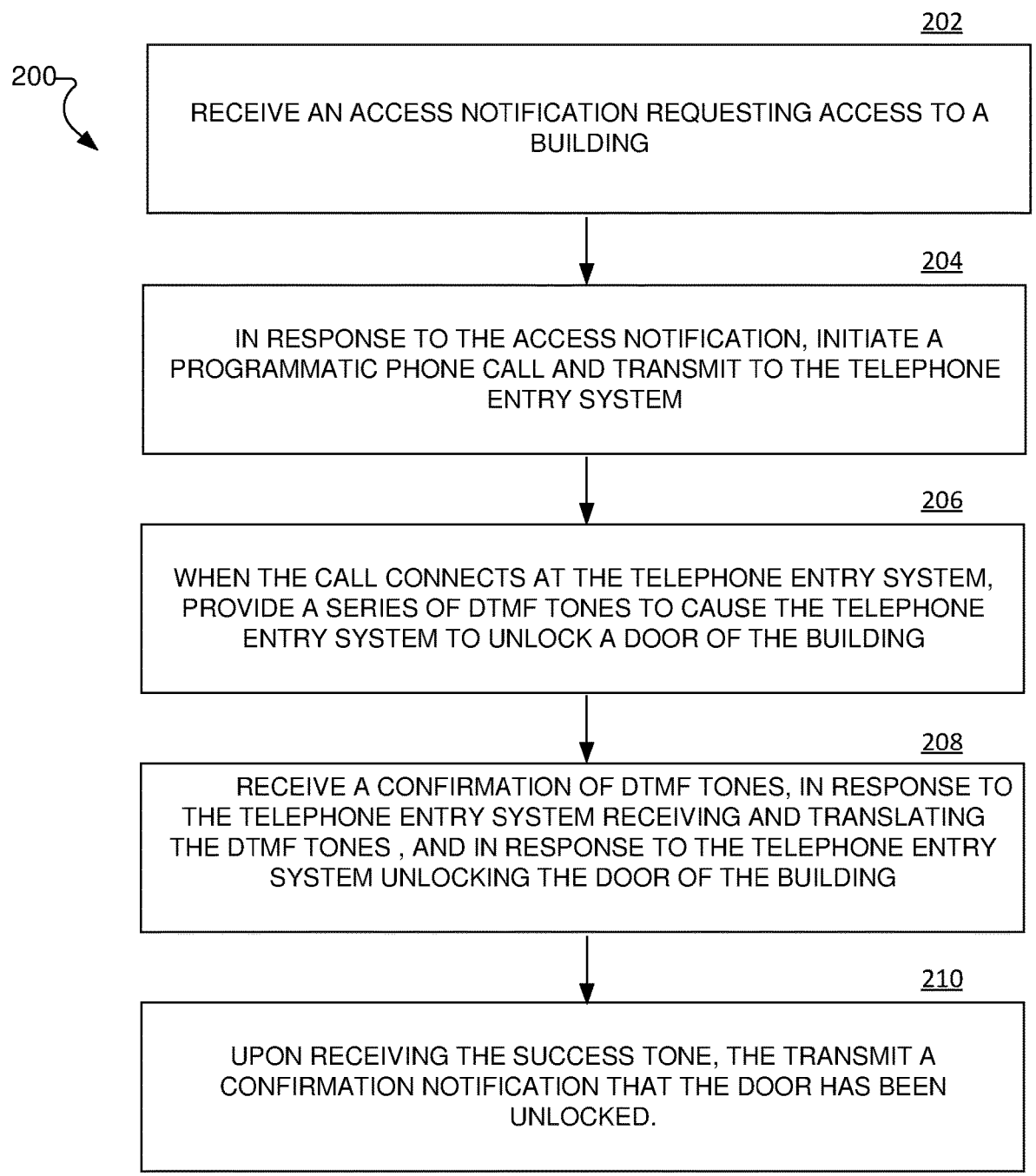
FIG. 2 is a flowchart of a process for accessing a building using a remote device, according to aspects of the present disclosure.

Referring now to FIG. 2 and with reference to FIG. 1, an illustrative process 200 for accessing a building using a remote communication device, such as a mobile phone is provided. In such scenarios, for requesting access, a user need not be proximally located to a telephone entry system. The process 200 may be implemented and/or executed by the various components of the system 100 and within the system 100.

The process 200 begins at 202, with receiving an access notification requesting access to a building from a remote computing device. For example, referring to FIG. 1, a user may interact with one of the one or more communication devices $122_1$, $122_2$,-$122_N$ to provide input indicating that the user would like to unlock the door and access the building 102. Alternatively, in another example, the access notification may be generated by a background process executing at a particular one of the one or more communication devices $122_1$, $122_2$,-$122_N$, automatically. For example, a communication device may generate an access notification automatically to trigger the "unlock" notification based on user's proximity to building 102, where the proximity may be detected using, for example bluetooth beacon technology, geofencing technology, global positioning system (GPS), or the like. In either scenario, the one or more communication devices $122_1$, $122_2$,-$122_N$ transmits the unlock notification to the server computing device 120.

In certain embodiments, the access notification may include access codes. Alternatively and/or additionally, the server computing device 122 may transmit a request for an access code to the one or more communication devices $122_1$, $122_2$,-$122_N$ upon receipt of access notification. The access code may be provided by a visitor requesting access to the building and/or stored in the one or more communication devices $122_1$, $122_2$,-$122_N$ for transmittal to the server computing device 122 with the access notification (and/or in response to a request from the server computing device 122).

As used herein, an access code may be a sequence of any combination of numbers, letters, special characters, and/or specific buttons to press (for example, "46#4562" or "38 CALL 6537") that may be used by the server computing device 122 to verify whether or not a visitor requesting access to a building is permitted to enter that building. In one or more embodiments, each building may be associated with one or more access codes at any particular time. For example, each resident of the building may have one or more unique access codes. Alternatively, all residents may share one access code. Alternatively and/or additionally, a visitor may have a unique access code. An access code may be valid for access to a building permanently, for one-time use, for a certain time period, for use during specific times of day/specific days of week/specific date(s), or the like.

Generation of access codes: The server computing device 122 may generate and store the temporary access codes, and the corresponding validity constraints (e.g., permanently valid, one-time use, times of validity, etc.). Upon expiry of an access code, the server computing device 122 may generate new access codes. Optionally, the server computing device 122 may delete expired and/or inactive access codes from memory. The server computing device may also transmit the generated access codes to users (e.g., building residents, authorized visitors, etc.) for usage while requesting access to the building. For example, the if a visitor has permission to enter a building at a certain time (e.g., by an authorized personnel), the authorized personnel may request the server computing device 122 to generate an access code and transmit it to such visitor directly. In some embodiments, the authorized personnel may receive the access code from the server computing device 122, and provide it to such visitor. The access code may be provided to such visitor via, for example, a user interface of the such visitor's one or more communication devices $122_1$, $122_2$,-$122_N$ and/or to an application of the one or more communication devices $122_1$, $122_2$,-$122_N$.

Alternatively and/or additionally, an authorized personnel or anyone who is authorized to create access codes may provide an access code to the server computing device 120 for storage and/or to a visitor. Subsequently, the stored temporary access code may be used by the system to verify that a user should have access to a building, such as the building 102.

At 204, in response to the access notification, a programmatic phone call is initiated and transmitted to the telephone entry system. Referring to FIG. 1, the server computing device 120 transmits a programmatic phone call to the telephone entry system 122.

In certain embodiments, the server computing device 122 may only initiate and transmit the programmatic phone call if the received access code is validated or verified as being accurate (e.g., active for the requested access time, not expired, correct, etc.) for providing access to the building 102. The server computing device 122 may verify the accuracy of the received access code by matching it with a stored access code using any now or hereafter known methods. For example, checking whether the access code is an access code that exists on the server database and subsequently if the access code was entered during the valid date & time period previously defined. Since our the server computing device 120 stores the list of valid access codes, the system can interpret the numbers entered to determine a match. If a match is identified, the system then checks the dates and times associated with that access code to see if the time is valid (for example, if the access code is a recurring access code valid for every Monday from 9 AM to 10 AM, the system checks if the local time at the telephone entry system is Monday between 9 AM and 10 AM).

At 206, when the call connects at the telephone entry system 122, the server computing device 120 automatically provides a series of DTMF tones (for example, "*169863w9") to remotely cause the telephone entry system to provide access, or unlock a door, at a building to which the telephone entry system is connected. In one specific example, the DTMF tones may enter a password or master code (a series of numbers, programmatic waits, and special characters) into the telephone entry system to "authenticate" the call. In another example, the DTMF tones may enter the designated door open tone to unlock the door (for example, "9" or "7"). The use of DTMF tones for unlocking the door is exemplary, and other now or hereafter known methods are within the scope of this disclosure.

At 208, upon reception and translation of the DTMF tones entered by the server computing device 120, the telephone entry system unlocks the door electronically and transmits a confirmation DTMF tone to the server computing device 120.

At 210, upon receiving the success tone, the server transmits a confirmation notification to the one or more communication devices $122_1$, $122_2$,-$122_N$ that the door has been unlocked.

Figure 3:
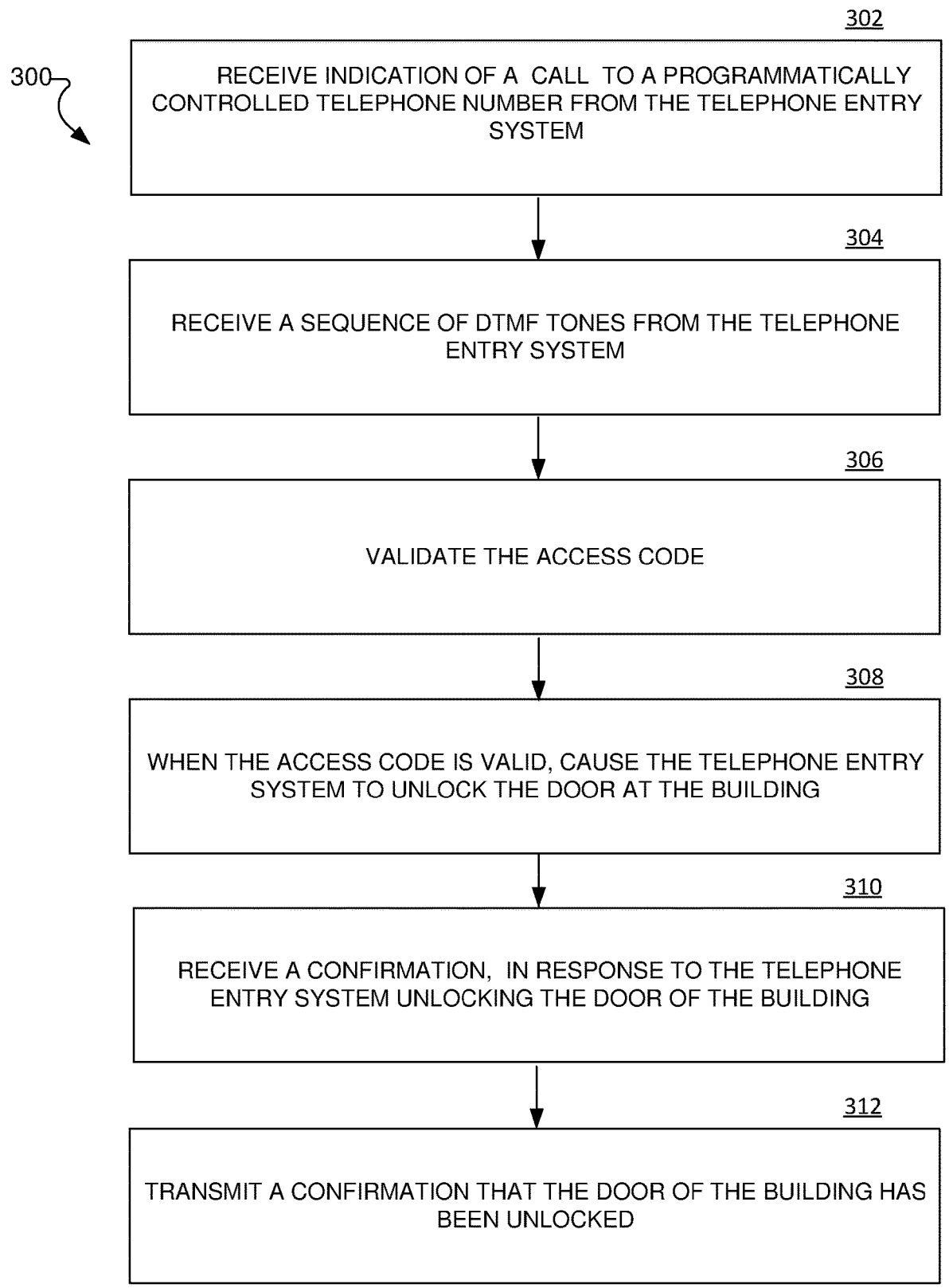
FIG. 3 is a flowchart of an example process for generating temporary access codes for use in accessing a building using a remote device, according to aspects of the present disclosure.

Referring now to FIG. 3, an example alternative embodiment for granting access to a building is illustrated for scenarios when a visitor is in physical proximity of a telephone entry system, and does not require the use of one or more communication devices $122_1$, $122_2$,-$122_N$ for requesting access to a building. In such an embodiment, the telephone entry system 122 transmits the call initiated by a user to a resident for requesting access to a predetermined phone number associated with the system, instead of to the resident. The system may then grant access to the user after verification of an access code. The process 300 may be implemented and/or executed by the various components of the system 100 and within the system 100.

At 302, an access code is received at the telephony entry system 122, which initiates a call from the telephone entry system 122 to a programmatically controlled telephone number, connected to the server computing device 120. In one specific example, the generated temporary code is received in response to when a visitor/guest enters at least a part of the access code and/or the complete access code into the telephone entry system. In certain embodiments, entering or dialing a part of the access code may trigger a call to a predetermined phone number entered into the system. For example, the dialing of "46#" or the "38 CALL" of the "46#4562" or the "38 CALL 6537" temporary access code) may cause the telephone entry system to call the predetermined phone number. The remaining access code may be received from the user (e.g., by dialing into the telephone entry system) and/or from a communication device (as discussed above).

At 304, a sequence of DTMF tones is transmitted over the connected call between the telephone entry system and the server (using the programmatic telephone number). The server receives the sequence of DTMF tones entered from the temporary access code, interpreting them as their numerical and/or character values (e.g., "4562" or "6537"). More specifically, the entry of the second part of the temporary access code (as explained in the previous step) is interpreted by the server computing device 120 as a numerical access code based upon their DTMF tones.

At 306, the server validates or verifies the entered access code, as discussed above. At 308, the server responds with a verbal message over the call connected to the telephone entry system indicating whether the entered access code is valid or invalid (for example, if the access code is no longer valid, the visitor standing at the telephone entry system would hear a response such as "This access code is no longer valid"). In one example, if the entered temporary access code is valid, the server would programmatically enter the door open DTMF tone (for example, "9" or "7") to initiate the unlocking of the entrance using the telephone entry system.

At 310, upon reception and translation of the DTMF tones entered by the server computing device 120, the telephone entry system unlocks the door electronically and transmits a confirmation DTMF tone to the server computing device 120. In one example, the system may generate a voice message depending on whether or not the access code is valid (we can "say" a welcome message with the visitor's/guest's name if the code is valid, or we can "say" an error message if the code is not valid).

At 312, upon receiving the success tone, the server transmits a confirmation notification to the one or more communication devices $122_1$, $122_2$, $-122_N$ that the visitor/guest has entered the temporary code and that the door has been unlocked.

Figure 4:
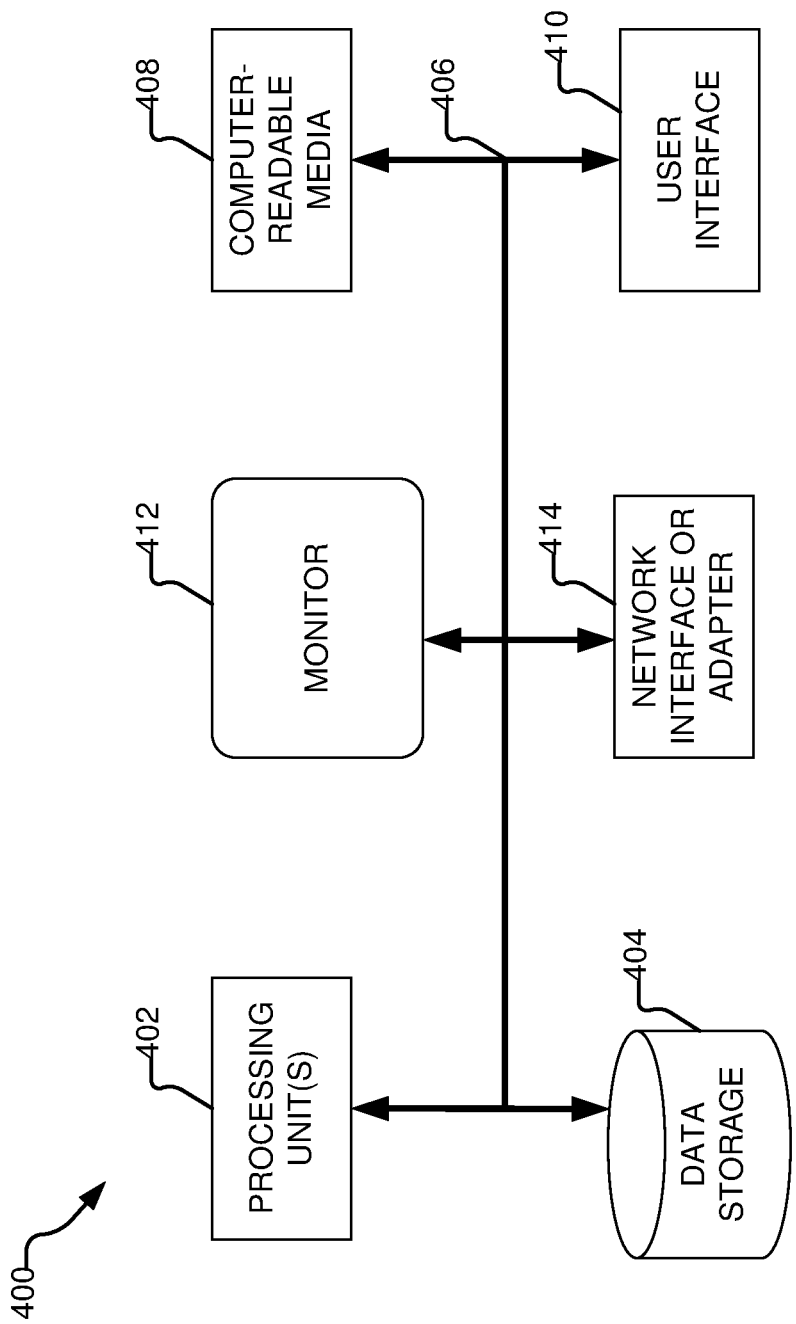
FIG. 4 is a block diagram illustrating a computing device specifically implemented to automatically provide access to buildings, according to aspects of the present disclosure.

FIG. 4 illustrates an example of a suitable computing and networking environment 400 that may be used to implement various aspects of the present disclosure described in FIGS. 1-3, such as the server computing device 120. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

What is claimed is:

1. A method for granting access to a building, the method comprising, by a processor:
    receiving, through an application downloaded and installed on a mobile electronic device of a user attempting to gain building access, a request for access to the building, wherein the request comprises an access code that comprises a sequence of numbers, letters, special characters, or specific buttons to press and that is entered using the application downloaded and installed on the mobile electronic device of the user;
    determining whether the access code is valid; and
    in response to determining that the access code is valid, transmitting to a telephone entry system associated with the building a sequence of dual-tone multi-frequency (DTMF) tones to cause the telephone entry system to grant access to the building, the application downloaded and installed on the mobile electronic device of the user being separate from the telephone entry system associated with the building,
    wherein receiving the request for access to the building comprises receiving, at a server computing device that is separate and remote from the telephone entry system, the request for access to the building,
    wherein determining whether the access code is valid comprises determining, by the server computing device, whether the access code is valid, and
    wherein the method further comprises transmitting, by the server computing device and prior to receiving the access code, the access code to the user for usage while requesting access to the building.

2. The method of claim 1, further comprising, by the processor, in response to determining that the access code is not valid, denying access to the building.

3. The method of claim 1, wherein the communication device mobile electronic device of the user is configured to transmit the request for access to the building to the processor upon occurrence of at least one of the following: receipt of a user request or detection of proximity to the building.

4. The method of claim 3, wherein the mobile electronic device of the user is configured to transmit the request for access to the building to the processor upon occurrence of a user request provided to the application downloaded and installed on the mobile electronic device of the user.

5. The method of claim 3, wherein the mobile electronic device of the user is configured to transmit the request for access to the building to the processor automatically, by a background process executing on the mobile electronic device of the user, upon occurrence of detection of proximity to the building.

6. The method of claim 1, wherein determining whether the access code is valid comprises determining whether the access code matches a previously stored access code.

7. The method of claim 1, wherein determining whether the access code is valid comprises determining whether a time constraint associated with the access code allows for grating granting access to the building at a requested time.

8. The method of claim 1, further comprising, in response to determining that the access code is valid, transmitting an access granted notification to a user requesting access.

9. The method of claim 1, wherein transmitting to the telephone entry system associated with the building the sequence of dual-tone multi-frequency (DTMF) tones to cause the telephone entry system to grant access to the building comprises initiating, by the server computing device, a programmatic phone call to the telephone entry system.

10. The method of claim 1, wherein transmitting the access code to the user for usage while requesting access to the building comprises transmitting, by the server computing device, the access code directly to a visitor based on a request to the server computing device received from an authorized personnel.

11. The method of claim 1, wherein transmitting the access code to the user for usage while requesting access to the building comprises transmitting, by the server computing device, the access code to the application downloaded and installed on the mobile electronic device of the user.

12. A system for granting access to a building, the system comprising:
    a telephone entry system associated with the building;
    a processor in communication with the telephone entry system; and
    a non-transitory computer readable medium comprising one or more programming instructions that when executed by the processor, cause the processor to:
        receive, through an application downloaded and installed on a mobile electronic device of a user attempting to gain building access, a request for access to the building, wherein the request comprises an access code that comprises a sequence of numbers, letters, special characters, or specific buttons to press and that is entered using the application downloaded and installed on the mobile electronic device of the user, determine whether the access code is valid, and in response to determining that the access code is valid, transmit to the telephone entry system associated with the building a sequence of dual-tone multi-frequency (DTMF) tones to cause the telephone entry system to grant access to the building, the application downloaded and installed on the mobile electronic device of the user being separate from the telephone entry system associated with the building, wherein the processor is configured to receive the request for access to the building by controlling a server computing device that is separate and remote from the telephone entry system to receive the request for access to the building, wherein the processor is configured to determine whether the access code is valid by controlling the server computing device to determine whether the access code is valid, and wherein the processor is configured to control the server computing device to transmit, prior to receiving the access code, the access code to the user for usage while requesting access to the building.

13. The system of claim 12, further comprising programming instructions that when executed by the processor, cause the processor to in response to determining that the access code is not valid, deny access to the building.

14. The system of claim 13, wherein the communication device mobile electronic device of the user is configured to transmit the request for access to the building to the processor upon occurrence of at least one of the following: receipt of a user request or detection of proximity to the building.

15. The system of claim 12, wherein the one or more programming instructions that when executed by the processor, cause the processor to determine whether the access code is valid comprises determining whether the access code matches a previously stored access code.

16. The system of claim 12, wherein the one or more programming instructions that when executed by the processor, cause the processor to determine whether the access code is valid comprises determining whether a time constraint associated with the access code allows for grating granting access to the building at a requested time.

17. The system of claim 12, further comprising programming instructions that when executed cause the processor to, in response to determining that the access code is valid, transmit an access granted notification to a user requesting access.

18. A method for granting access to a building, the method comprising, by a processor:

receiving, through an application downloaded and installed on a mobile electronic device of a user attempting to gain building access, a request for access to the building, wherein the request comprises an access code that comprises a sequence of numbers, letters, special characters, or specific buttons to press and that is entered using the application downloaded and installed on the mobile electronic device of the user;

determining whether the access code is valid; and in response to determining that the access code is valid, transmitting to a telephone entry system associated with the building a sequence of dual-tone multi-frequency (DTMF) tones to cause the telephone entry system to grant access to the building, the application downloaded and installed on the mobile electronic device of the user being separate from the telephone entry system associated with the building, wherein receiving the request for access to the building comprises receiving, at a server computing device that is separate and remote from the telephone entry system, the request for access to the building, wherein determining whether the access code is valid comprises determining, by the server computing device, whether the access code is valid, wherein transmitting to the telephone entry system associated with the building the sequence of dual-tone multi-frequency (DTMF) tones to cause the telephone entry system to grant access to the building comprises initiating, by the server computing device, a programmatic phone call to the telephone entry system, and wherein the method further comprises:

receiving, by the server computing device and from the telephone entry system, a success tone that indicates that a door to the building has been unlocked; and transmitting, by the server computing device and to the application downloaded and installed on the mobile electronic device of the user, a confirmation notification that the door has been unlocked.

* * * * *

UNITED STATES PATENT AND TRADEMARK OFFICE
CERTIFICATE OF CORRECTION

PATENT NO. : 11,210,876 B2
APPLICATION NO. : 16/591027
DATED : December 28, 2021
INVENTOR(S) : Benjamin Taylor It is certified that error appears in the above-identified patent and that said Letters Patent is hereby corrected as shown below:

In the Specification

Column 1, Line 7, delete "claims" and insert -- claims priority to --.

Column 1, Line 8, delete "62/740,841" and insert -- 62/740,841, --.

In the Claims

In Claim 3, Column 12, Lines 11-12, delete "the communication device" and insert -- the --.

In Claim 7, Column 12, Line 34, delete "grating granting" and insert -- granting --.

In Claim 14, Column 13, Line 32, delete "13," and insert -- 12, --.

In Claim 14, Column 13, Lines 32-33, delete "the communication device" and insert -- the --.

In Claim 16, Column 13, Lines 47-48, delete "grating granting" and insert -- granting --.

Signed and Sealed this
Third Day of May, 2022

Katherine Kelly Vidal
*Director of the United States Patent and Trademark Office*